United States Patent
Lee

(10) Patent No.: US 9,778,381 B2
(45) Date of Patent: Oct. 3, 2017

(54) READOUT CIRCUIT OF X-RAY DETECTOR

(71) Applicant: VIEWORKS CO., LTD., Gyeonggi-do (KR)

(72) Inventor: Bo Ram Lee, Seoul (KR)

(73) Assignee: VIEWORKS CO., LTD., Gyeonggi-Do (KR)

(*) Notice: Subject to any disclaimer, the term of this patent is extended or adjusted under 35 U.S.C. 154(b) by 0 days.

(21) Appl. No.: 15/189,398

(22) Filed: Jun. 22, 2016

(65) Prior Publication Data

US 2016/0377746 A1 Dec. 29, 2016

(30) Foreign Application Priority Data

Jun. 25, 2015 (KR) .................. 10-2015-0090352

(51) Int. Cl.
*H04N 5/32* (2006.01)
*G01T 1/24* (2006.01)
*H04N 5/378* (2011.01)

(52) U.S. Cl.
CPC .............. *G01T 1/247* (2013.01); *H04N 5/32* (2013.01); *H04N 5/378* (2013.01)

(58) Field of Classification Search
CPC ........... G01T 1/247; H04N 5/32; H04N 5/378
See application file for complete search history.

(56) References Cited

U.S. PATENT DOCUMENTS

2013/0001426 A1* 1/2013 Tredwell ............... G01T 1/2018
250/370.09

FOREIGN PATENT DOCUMENTS

| JP | 2014175896 A | 9/2014 |
| KR | 20050084209 A | 8/2005 |
| KR | 20110057678 A | 6/2011 |
| KR | 10-2014-0087247 | 7/2014 |

OTHER PUBLICATIONS

Office Action dated Sep. 19, 2016 in Korean Application No. 1020150090352.
Dali Wu, "Noise Analysis and Measurement for Current Mode and Voltage Mode Active Pixel Sensor Readout Methods", thesis presented to the University of Waterloo for the degree of Master of Applied Science in Electrical and Computer Engineering, 2010, Waterloo, Ontario, Canada.

* cited by examiner

*Primary Examiner* — Marcus Taningco
*Assistant Examiner* — Faye Boosalis
(74) *Attorney, Agent, or Firm* — Saliwanchik, Lloyd & Eisenschenk

(57) ABSTRACT

The present disclosure relates to a readout circuit of an X-ray detector which includes a data line capacitor to store an electrical signal output from a pixel, an amplifier to amplify the electrical signal from the pixel, and a variable current load connected to an output terminal of the pixel.

7 Claims, 4 Drawing Sheets

READOUT CIRCUIT OF X-RAY DETECTOR

CROSS-REFERENCE TO RELATED APPLICATION

This application claims priority under 35 U.S.C. §119 to Korean Patent Application No. 10-2015-0090352, filed Jun. 25, 2015, which is hereby incorporated by reference in its entirety.

BACKGROUND

1. Field of the Invention

The present disclosure relates to a readout circuit of an X-ray detector, and more particularly, to a readout circuit having a current load of an X-ray detector.

2. Discussion of Related Art

An X-ray detector is a device for detecting an X-ray signal to convert the detected X-ray signal into an electrical signal, and generally converts an X-ray signal into an electrical signal using a photodiode.

In other words, a scintillator or a phosphor being located in front of a photodiode may absorb X-rays to radiate visible light corresponding to the absorbed X-rays, the photodiode may convert the visible light into a photocurrent in proportion to an amount of the visible light, and the converted photocurrent may be measured to detect the X-rays.

A typical X-ray detector is provided with a plurality of pixels, each of which includes such a photodiode, and these pixels are arranged in the form of a matrix to detect X-rays.

Also, the X-ray detector includes a gate driver for sequentially selecting a single row of such pixels at which a signal is collected and a readout circuit for collecting signals from the pixels at the selected row, reads intensity of the detected X-ray, and converts the readout signal through the readout circuit into digital data through post-processing circuits including an analog-to-digital converter (ADC) and the like to use the digital data in a generation of an X-ray image.

Meanwhile, the background art of the present disclosure is disclosed in Korean Laid-Open Patent Application No. 10-2014-0087247 (Jul. 9, 2014).

SUMMARY OF THE INVENTION

As described above, a readout circuit of an X-ray detector connects a pixel to post-processing circuits in an analog form so that there is a limitation on a structure of the pixel or the post-processing circuits including an ADC and the like.

In other words, a readout circuit should be designed in an optimal form according to a structure of a pixel or an ADC and the like, a purpose of an X-ray detector (for example, for a radiography, and a fluoroscopy), and the like, thereby obtaining a desired dynamic rage, a desired delay time, and the like.

However, due to problems including a time or a cost required for a circuit design and the like, it is impossible to design an optimal readout circuit at every time so that a readout circuit previously used is directly reused without any modification.

As a result, there are problems in that difficulty in a data processing resulting from a processing speed degradation of a readout circuit and non-uniformity between pixels, damage due to a leakage current, and the like.

To address the problems of the typical readout circuit of an X-ray detector described above, an object of the present disclosure is to provide a readout circuit of an X-ray detector capable of ensuring a normal operation of the X-ray detector and improving a detection speed thereof.

A readout circuit of an X-ray detector according to the present disclosure includes a data line capacitor configured to store an electrical signal output from a pixel, an amplifier configured to amplify the electrical signal from the pixel, and a variable current load connected to an output terminal of the pixel.

The amplifier may have the output terminal of the pixel as an input of the amplifier.

The readout circuit of an X-ray detector according to the present disclosure may further include a feedback capacitor connected between the output terminal of the pixel and an output terminal of the amplifier.

The data line capacitor may be connected to the output terminal of the pixel.

The variable current load may provide at least two kinds of currents having intensities different from each other.

The variable current load may provide a first intensity current from an operation start of the X-ray detector to a readout process thereof, and a second intensity current greater than the first intensity current from just after the readout process of the X-ray detector to a next operation thereof.

The variable current load may include two transistors configured to configure a current mirror, and at least two voltage sources configured to provide a voltage to the current mirror, wherein the at least two voltage sources may be selected according to an operation of the X-ray detector.

The variable current load may include a transistor connected to the output terminal of the pixel, and at least two voltage sources configured to supply a bias voltage to the transistor, wherein the at least two voltage sources may be selected according to an operation of the X-ray detector.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
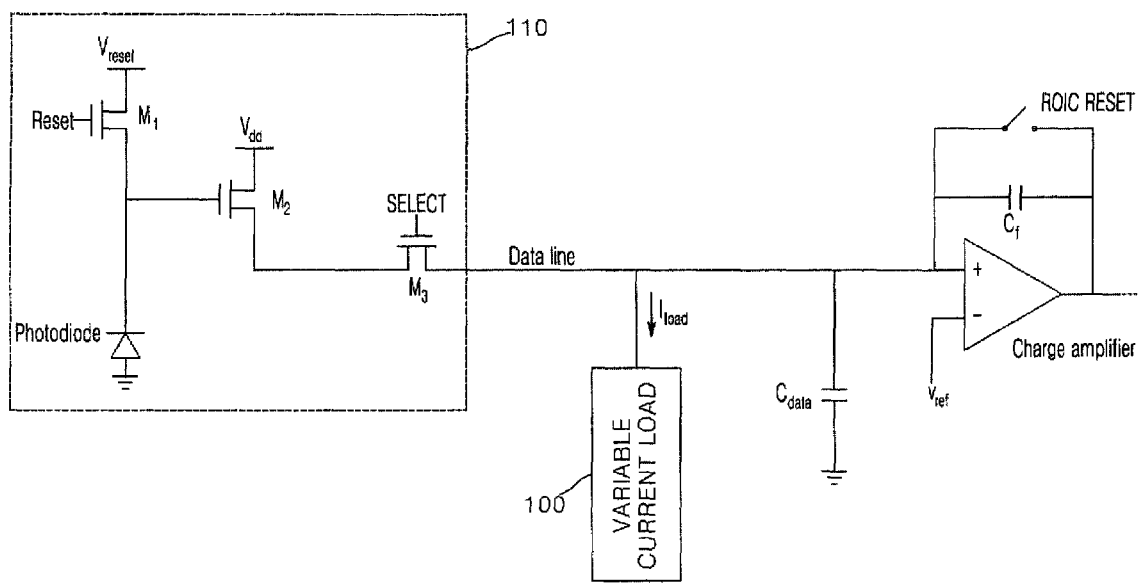
FIG. 1 is an exemplary diagram illustrating a configuration of a readout circuit of an X-ray detector according to one embodiment of the present disclosure.

Hereinafter, one embodiment of a readout circuit of an X-ray detector according to the present disclosure will be described with reference to the accompanying drawings. By describing the present disclosure, a thickness of a line, a size of a component and the like, which are shown in the drawings, will be somewhat exaggerated to help clearness of a description and understanding thereof. And, all terms used hereinafter are selected by considering functions in embodiments, and meanings thereof may be different according to a user, the intent of an operator, or custom. Therefore, the meanings of the terms used herein should follow contexts disclosed herein.

Figure 2:
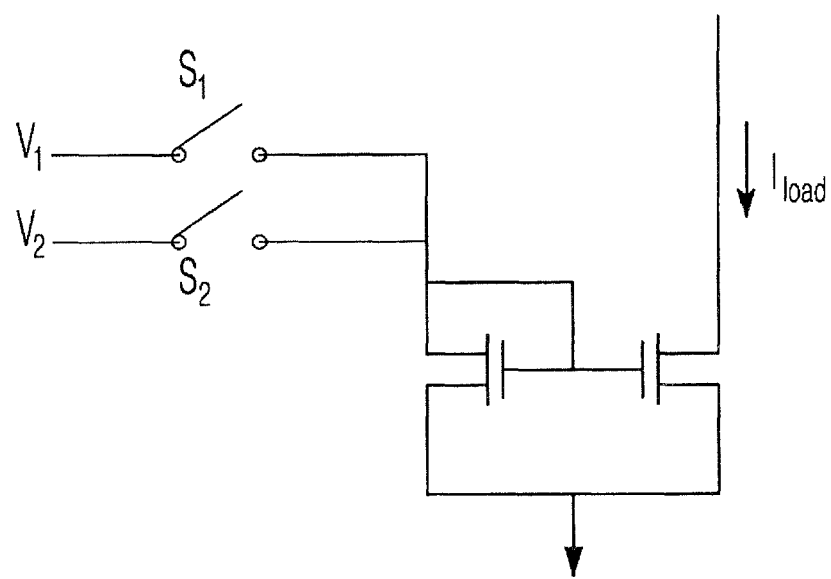
FIG. 2 is an exemplary diagram illustrating a variable current load of the readout circuit of the X-ray detector according to one embodiment of the present disclosure.
Figure 3:
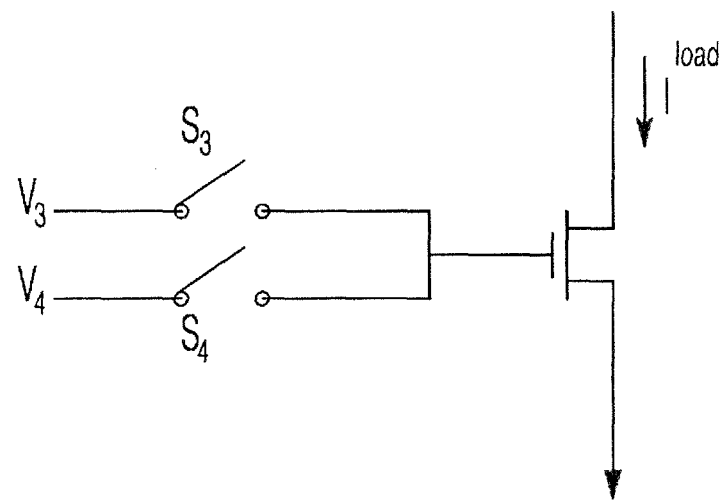
FIG. 3 is another exemplary diagram illustrating a variable current load of the readout circuit of the X-ray detector according to one embodiment of the present disclosure.
Figure 4:
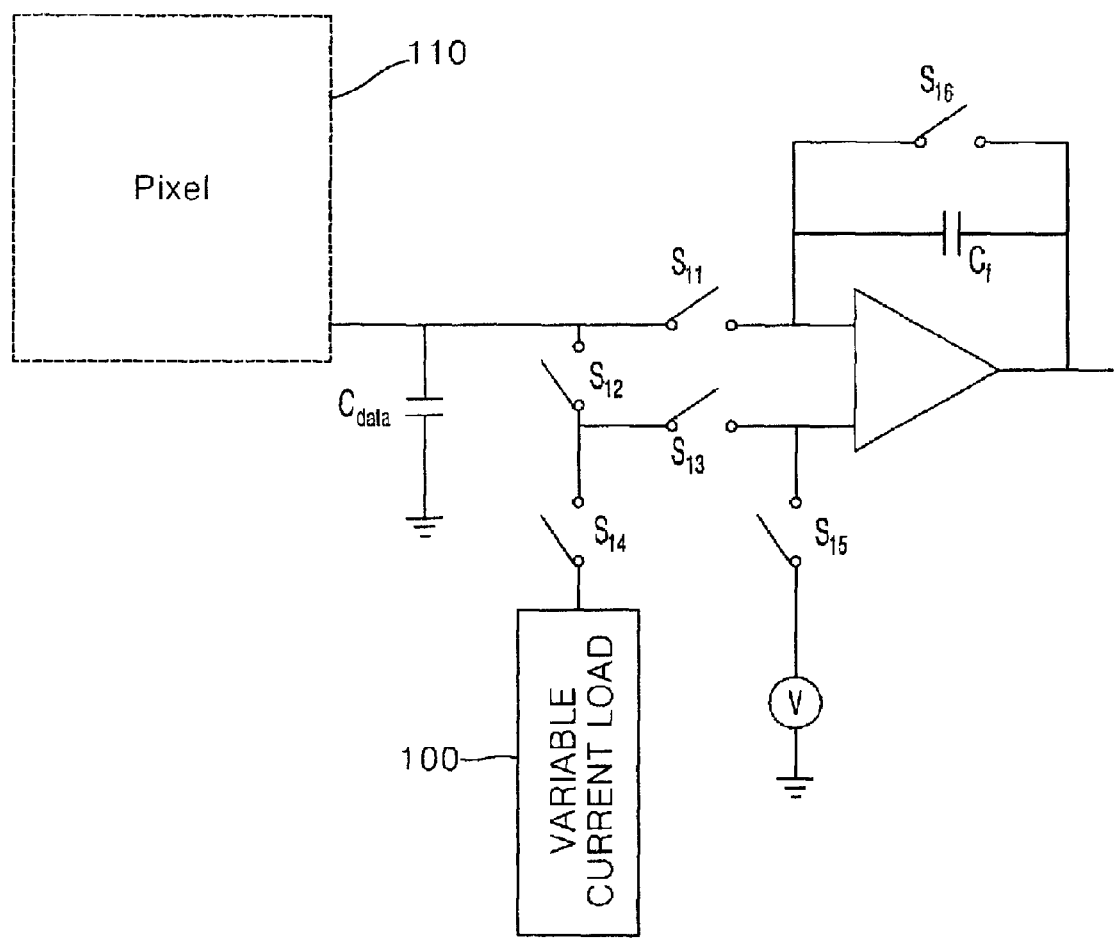
FIG. 4 is an exemplary diagram for describing the readout circuit of the X-ray detector according to one embodiment of the present disclosure.

FIG. 1 is an exemplary diagram illustrating a configuration of a readout circuit of an X-ray detector according to one embodiment of the present disclosure, FIG. 2 is an exemplary diagram illustrating a variable current load of the readout circuit of the X-ray detector according to one embodiment of the present disclosure, FIG. 3 is another exemplary diagram illustrating a variable current load of the readout circuit of the X-ray detector according to one embodiment of the present disclosure, FIG. 4 is an exemplary diagram for describing the readout circuit of the X-ray detector according to one embodiment of the present disclosure, and, with reference to these drawings, a readout circuit of an X-ray detector according to the present embodiment will be described as follows.

As shown in FIG. 1, a readout circuit of an X-ray detector according to one embodiment of the present disclosure includes a variable current load 100, a feedback capacitor $C_f$, a data line capacitor $C_{data}$, and an amplifier.

The variable current load 100 may be connected to an output terminal of a pixel 110, that is, a data line of the pixel 110 to provide a current load to the pixel 110.

That is, since a transistor $M_2$ being used as a source follower in an active pixel sensor (APS) should always operate in a saturation state, a current load $I_{load}$ is necessary. In particular, since a pixel sensor configured with a thin film transistor, which is widely used in an X-ray detector for the reason that it can be produced at a low substrate temperature with a wide area and also at a relatively low production cost, has low field effect mobility due to a high state density in a band gap, a current load should be necessary.

However, an excessively large load may make a large difference between an input of the source follower $M_2$ and an output thereof to reduce a dynamic range of an X-ray detector, so that it may be preferable to employ a small current load capable of merely maintaining a saturation state of the transistor $M_2$ used as a source follower.

Also, since a suitable OFF voltage (it means a voltage to turn off a transistor) is not applied to a transistor existing at the pixel 110 or due to a dark current of a photodiode, a leakage current may exist at the pixel 110. When such a leakage current exists, a voltage of a photodiode may not sustain a voltage dropped due to an incident X-ray to rise gradually to a reset voltage $V_{reset}$. On the other hand, if an appropriate current load is provided to the pixel 110 as in the present embodiment, a voltage of a photodiode may be prevented from rising over a predetermined voltage.

Meanwhile, due to a characteristic of a manufacturing process of such a pixel 110, uniformity between panels or between pixels in a panel may not be perfectly ensured. However, since an analog-to-digital converter (ADC) of post-processing circuits of an X-ray detector can always digitalize only a voltage within a constant voltage range, an appropriate driving point per pixel or panel should be found. Therefore, if the variable current load 100 is employed as in the present embodiment, through an adjustment of a readout circuit, that is, by adjusting a current value of the variable current load 100, a driving point per pixel and panel may be constantly tuned so that a design of post-processing circuits including an ADC and the like may be simplified.

Since a time for stabilizing a voltage of a capacitor ($I=C*(dV(t))/dt$) is shortened as a current load is greater more and more, it may be advantageous to take a moving image. On the other hand, when taking a still image, it may be advantageous to use a small current load to secure a dynamic range as much as possible. Therefore, when the variable current load 100 is employed, an appropriate current load may be provided according to a photographing mode.

The pixel 110 may output an electrical signal corresponding to an amount of incident X-rays.

In particular, when $M_1$ is in an ON state, that is, an X-ray detector is in a reset state, a voltage of a photodiode is sustained at a reference voltage. In other words, since a capacitance of a photodiode itself exists, it may be regarded that a capacitor is connected to the photodiode in parallel and charges are accumulated in such a capacitor.

Thereafter, when the X-ray detector is in an integration state, that is, $M_1$ is turned off, charges of $\Delta Q$ in proportion to the amount of the incident X-rays discharge the capacitor. Therefore, a voltage level of the photodiode is dropped as much as $\Delta V$ in proportion to $\Delta Q$.

Finally, when the X-ray detector is in a readout state, that is, $M_3$ is turned on, a voltage of the photodiode is reflected to the source terminal of the source follower $M_2$ and is output through $M_3$.

The output voltage accumulates charges at the data line capacitor $C_{data}$ connected to the data line of the pixel 110. In other words, the data line capacitor $C_{data}$ may store an electrical signal from the pixel 110. Thereafter, the charges accumulated at the data line capacitor $C_{data}$ are accumulated at the feedback capacitor $C_f$ and then are output. That is, an amplifier performs a function to amplify and readout the voltage of the photodiode.

However, the feedback capacitor $C_f$ of the amplifier used in the readout circuit of the X-ray detector generally uses a very small value so as to obtain a high gain through the amplifier. In such a case, it should be careful so that the feedback capacitor $C_f$ should not be saturated by a current load supplied from the variable current load 100. For example, when a maximum output voltage of the amplifier having a feedback capacitor $C_f$ of 1 pico-farads (pF) is 15 volts (V) and a current load is 1.5 micro amperes (μA), the feedback capacitor $C_f$ is saturated at 10 micro seconds (μs).

$$V=Q/C=I*T/C$$

In other words, a saturation time of a feedback capacitor $C_f$ is very short in most cases, and the reason is that an X-ray detector does not normally operate if a time at which charges are accumulated at the feedback capacitor $C_f$ is longer than a time at which the feedback capacitor $C_f$ is saturated by a current load when the X-ray detector performs a readout operation.

Therefore, similar to a ensuring of a normal operation of the source follower $M_2$ as described above, in order to ensure a normal operation of the X-ray detector, a current load having a small value should be provided within a possible range.

However, when a current load having a small value is provided, a time is much more required to discharge the data line capacitor $C_{data}$ just after a readout operation of the X-ray detector. Specifically, a thin film transistor having current drivability inferior to that of a complementary metal oxide semiconductor (CMOS) has a very long discharge time such that there may be a problem in that an entire speed of the X-ray detector is lowered.

That is, the variable current load 100 supplies two kinds of currents having intensities different from each other, and supplies a low intensity current from an operation start of the X-ray detector to a readout process thereof and a high intensity current from just after the readout process of the X-ray detector to a next operation thereof.

In other words, the variable current load 100 supplies a low intensity current from an operation start of the X-ray detector to a readout process thereof to ensure normal operations of the source follower $M_2$ and the feedback capacitor $C_f$, and a high intensity current from just after the readout process of the X-ray detector to a next operation thereof to reduce a discharge time of the data line capacitor $C_{data}$, thereby improving a detection speed of the X-ray detector.

Such a variable current load 100 may be in the form of, for example, a current mirror. That is, as it can be seen from FIG. 2, the variable current load 100 includes two voltage sources supplying voltages to two transistors configuring a current mirror and to the current mirror, and such two voltage sources may be a form to be selectively switched according to an operation of the X-ray detector.

For example, when $V_2$ is set to a voltage higher than a voltage of $V_1$, if $S_1$ is closed and $S_2$ is opened from an operation start of the X-ray detector to a readout process thereof and thus $V_1$ is supplied to a current mirror, and otherwise, $S_1$ is opened and $S_2$ is closed from just after the readout process of the X-ray detector to a next operation thereof and thus $V_2$ is supplied to the current minor, a normal operation of the X-ray detector may be ensured and also a detection speed thereof may be improved.

Also, as shown in FIG. 3, the variable current load 100 may include a transistor connected to an output terminal of the pixel 110 and two voltage sources supplying a bias voltage to the transistor, and such two voltage sources may be a form to be selectively switched according to an operation of the X-ray detector.

When the variable current load 100 is implemented in the form of a current mirror, a variation of a load current due to a circuit does not occur so that a circuit may be stably implemented as compared with a usage of a saturation of a transistor.

Meanwhile, although the present embodiment has been described on the basis of an active pixel sensor, a passive pixel sensor (PPS) may also output an electrical signal corresponding to an amount of incident X-rays, and in such a case, accumulated charges themselves are moved instead of a voltage signal.

Also, as shown in FIG. 4, the readout circuit of the X-ray detector according to the present embodiment may be a readout circuit capable of performing four mode operations. In other words, when the pixel 110 is an active pixel sensor, the readout circuit of the X-ray detector according to the present embodiment may operate in a voltage mode in which $S_{12}$, $S_{13}$, $S_{14}$, and $S_{16}$ are connected, a charge mode in which $S_{12}$ and $S_{15}$ are connected and $S_{11}$ and $S_{14}$ are variably controlled, and a current mode in which $S_{15}$ is connected and $S_{11}$ is variably controlled.

Also, when the pixel 110 is a passive pixel sensor, the readout circuit of the X-ray detector according to the present embodiment may operate in a charge mode in which $S_{11}$ and $S_{15}$ are connected.

However, a detailed operation of each mode can be easily understood from a configuration of a circuit by those skilled in the art so that a detailed description thereof will be omitted.

That is, when a mode of a readout circuit is changed, an optimal value of a current load per each mode may be different and modes are divided into a mode requiring a current load and a mode not requiring the current load, so that X-rays may be detected under a more optimized condition if the variable current load 100 is used.

As described above, the readout circuit of the X-ray detector according to the embodiment of the present disclosure may include a variable current load connected to an output terminal of a pixel to ensure a normal operation of the X-ray detector. Also, the readout circuit of the X-ray detector according to the embodiment of the present invention may provide a low intensity current from an operation start of the X-ray detector to a readout process thereof and a high intensity current from just after the readout process of the X-ray detector to a next operation thereof through a variable current load, thereby providing effectiveness in that a detection speed of the X-ray detector can be improved.

Although the present disclosure has been described in conjunction with embodiments shown in the drawings, these embodiments are illustrative, and it should be understood that numerous other modifications and equivalent other embodiments can be devised by those skilled in the art from this disclosure. Therefore, the scope of the present invention should be defined by the appended claims.

What is claimed is:

1. A readout circuit of an X-ray detector, comprising:
    a data line capacitor configured to store an electrical signal output from a pixel;
    an amplifier configured to amplify the electrical signal from the pixel; and
    a variable current load connected to an output terminal of the pixel,
    wherein the variable current load provides at least two kinds of currents having intensities different from each other, and
    wherein the variable current load includes:
    two transistors configured to configure a current mirror; and
    at least two voltage sources configured to provide a voltage to the current mirror,
    wherein the at least two voltage sources are selected according to an operation of the X-ray detector.

2. The readout circuit of claim 1, wherein the amplifier has the output terminal of the pixel as an input of the amplifier.

3. The readout circuit of claim 2, further comprising:
    a feedback capacitor connected between the output terminal of the pixel and an output terminal of the amplifier.

4. The readout circuit of claim 1, wherein the data line capacitor is connected to the output terminal of the pixel.

5. The readout circuit of claim 1, wherein the variable current load a first intensity current having a duration from start of the operation of the X-ray detector to an end of a readout process thereof, and a second intensity current being greater than the first intensity current and having a duration from the end of the readout process of the X-ray detector to start of a next operation thereof.

6. A readout circuit of an X-ray detector, comprising:
    a data line capacitor configured to store an electrical signal output from a pixel;
    an amplifier configured to amplify the electrical signal from the pixel; and
    a variable current load connected to an output terminal of the pixel,
    wherein the variable current load provides at least two kinds of currents having intensities different from each other, and
    wherein the variable current load provides a first intensity current having a duration from start of an operation of the X-ray detector to an end of a readout process thereof, and a second intensity current being greater than the first intensity current and having a duration from the end of the readout process of the X-ray detector to start of a next operation thereof.

7. The readout circuit of claim 6, wherein the variable current load includes:
- a transistor connected to the output terminal of the pixel; and
- at least two voltage sources configured to supply a bias voltage to the transistor,
- wherein the at least two voltage sources are selected according to the operation of the X-ray detector.

* * * * *